(12) United States Patent
Yamasaki et al.

(10) Patent No.: US 9,042,707 B2
(45) Date of Patent: May 26, 2015

(54) APPARATUS AND METHOD FOR EDITING

(75) Inventors: Akihiro Yamasaki, Kobe (JP); Yasunori Nii, Kobe (JP); Yoshiharu Suzuki, Kobe (JP)

(73) Assignee: GVBB Holdings S.A.R.L., Luxembourg (LU)

( * ) Notice: Subject to any disclaimer, the term of this patent is extended or adjusted under 35 U.S.C. 154(b) by 113 days.

(21) Appl. No.: 13/257,574

(22) PCT Filed: Jul. 2, 2009

(86) PCT No.: PCT/JP2009/003066
§ 371 (c)(1),
(2), (4) Date: Jan. 5, 2012

(87) PCT Pub. No.: WO2010/106586
PCT Pub. Date: Sep. 23, 2010

(65) Prior Publication Data
US 2012/0093487 A1    Apr. 19, 2012

(30) Foreign Application Priority Data
Mar. 19, 2009    (JP) .................... 2009-068566

(51) Int. Cl.
H04N 5/93 (2006.01)
G11B 27/034 (2006.01)
G11B 27/00 (2006.01)
G11B 27/34 (2006.01)

(52) U.S. Cl.
CPC ............ *G11B 27/034* (2013.01); *G11B 27/005* (2013.01); *G11B 27/34* (2013.01)

(58) Field of Classification Search
CPC .... G11B 27/005; G11B 27/034; G11B 27/34; G11B 27/28; H04N 21/4325; H04N 21/8455
USPC .................................. 386/278, 282
See application file for complete search history.

(56) References Cited

U.S. PATENT DOCUMENTS

| 7,103,839 B1 | 9/2006 | Natkin et al. |
| 7,295,757 B2 * | 11/2007 | Green .................... 386/248 |
| 8,170,396 B2 | 5/2012 | Kuspa et al. |
| 2003/0164845 A1 | 9/2003 | Fayan et al. |
| 2004/0032434 A1 * | 2/2004 | Pinsky et al. ............ 345/814 |

(Continued)

FOREIGN PATENT DOCUMENTS

| CN | 101290787 A | 10/2008 |
| EP | 1 503 587 | 2/2005 |

OTHER PUBLICATIONS

Figura, J., et al. "Tutorial: Warping Time with Avid Liquid Timewarp, Part Two", Jan. 30, 2007, retrieved from the Internet: URL:http://www.eventdv.net/Articles/News/Feature/Tutorial-Warping-Time-with-Avid-Liquid-Timewarp,-Part-Two-37977.htm, pp. 1-4, XP002556767.

(Continued)

*Primary Examiner* — Thai Tran
*Assistant Examiner* — Jose Mesa
(74) *Attorney, Agent, or Firm* — Arent Fox LLP

(57) ABSTRACT

An editing method comprises: generating, from a material data which is generated according to a first time and in which a first time range is specified, a playback data that is to be played back according to a second time different from the first time; and locating a second time range, which includes the material data within the first time range, in the playback data.

22 Claims, 12 Drawing Sheets

(56) References Cited

U.S. PATENT DOCUMENTS

2006/0143667 A1* 6/2006 Kurosawa ........................ 725/89
2008/0253735 A1* 10/2008 Kuspa et al. .................... 386/52

OTHER PUBLICATIONS

Preston, B., "Time Remapping in After Effects", retrieved from the Internet: URL:http://library.creativecow.net/articles/preston_bryan/time_remapping.php, pp. 1-4, XPOO2556768.

International Search Report for International Application No. PCT/JP2009/003066, mailed Dec. 7, 2009, 3 pages.
IPRP dated Sep. 20, 2011 with Written Opinion regarding PCT Application No. PCT/JP2009/003066.
Chinese Office Action dated Jan. 2, 2014 regarding China Patent Application No. 200980159342.5.
Chinese Office Action dated Aug. 5, 2014 regarding China Patent Application No. 200980159342.5.
EP Communication dated Dec. 23, 2014, regarding EP 0987897.9.

* cited by examiner

| | DIFFERENTIAL VALUE IS POSITIVE | DIFFERENTIAL VALUE IS ZERO AND SECOND-ORDER DIFFERENTIAL VALUE IS POSITIVE | DIFFERENTIAL VALUE IS ZERO AND SECOND-ORDER DIFFERENTIAL VALUE IS NEGATIVE | DIFFERENTIAL VALUE IS NEGATIVE |
|---|---|---|---|---|
| POINT AT WHICH STARTING POSITION OF MATERIAL TIME RANGE INTERSECTS GRAPH | STARTING | STARTING | ENDING | ENDING |
| POINT AT WHICH ENDING POSITION OF MATERIAL TIME RANGE INTERSECTS GRAPH | ENDING | ENDING | STARTING | STARTING |

FIG. 6

APPARATUS AND METHOD FOR EDITING

CROSS-REFERENCE TO RELATED APPLICATIONS

The application is a United States National Stage Application under 35 U.S.C. §371 of International Patent Application No. PCT/JP2009/003066, filed Jul. 2, 2009, which claims the benefit to Japanese Application No. 2009-068566, filed Mar. 19, 2009, each of which is incorporated by reference into this application as if fully set forth herein.

TECHNICAL FIELD

The present invention relates to an editing apparatus, editing method, editing program and data structure.

BACKGROUND ART

There conventionally exist, for video editions, an approach in which editions are performed on a videotape or film on which video or images have been recorded and an approach in which video or image data recorded on a videotape or film is converted to digital data for editions.

In the case of performing editions on a videotape or film on which video or images have been recorded, it is necessary to perform editions sequentially for a time axis of video or image data that is material (which time axis will be referred to as "material time" hereinafter), while reading temporal information that is called time code. Therefore, the editing operation is linear for the material time. In contrast, video or image data as converted to digital data, if stored in a hard disc or the like of a personal computer, workstation or the like, can be flexibly edited in addition to the playback direction and playback time by accessing the stored video data on a random basis without taking the material time into account. Therefore, the editing operation may be nonlinear for the material time. For this reason, an apparatus for digitally editing video data is also called "nonlinear editing apparatus". If such a nonlinear editing apparatus is used, then a wide variety of editions can be performed, beyond comparison with the conventional tape editions using videotapes, without having to take the time code into account; for example, if some midway scene becomes unnecessary, the following scenes can be shifted forward.

In the case of using such a nonlinear editing apparatus, encoded video stored, for example, in a hard disc can be read therefrom, decoded, reproduced, and then edited while being viewed by use of a monitor. There conventionally exists a nonlinear video editing apparatus that can reproduce video data, which is to be edited, to allow the starting position (in-point) and ending position (out-point) of a scene, which is to be cut out, to be set at the corresponding positions of the video data, while allowing the video of the video data to be viewed. These in-point and out-point are associated with the video data and held as editing information, and a clip of the scene as cut out is formed based on this editing information. It should be noted that in the nonlinear video edition, there is no need to actually copy or cut any original video data in order to form clips and during a clip playback, a clip is specified, thereby referring to the editing information and decoding and reproducing the video data ranging from the in-point to the out-point.

Some types of nonlinear editing apparatuses can use an editing function, which is called "clip marker", to place marks at any desired scene positions of the video and audio of a clip. Further, patent literature 1 discloses an editing system wherein an editing function, which is called "time remapping", is used to flexibly change the playback rate of the video and audio of a clip to any desired rate and display the status of the change in the playback rate on a user interface. The playback rate can be changed by use of, for example, a key frame specified by a user or editor and a set of mathematical expressions of line segment interpolations and Bezier interpolations utilizing the key frame.

According to the conversional method, if video data that is material (which will be referred to as "material data" hereinafter) is subjected to editions including a time remapping conversion process to generate video data to be played back (which will be referred to as "playback data" hereinafter), then it is relatively easy to cause marks placed in the material data and indicating given "positions" on the material time to be reflected in the playback data. However, in a case where marks defining a given "range" on the material time are placed in the material data, if a time remapping conversion from the material time to the playback time is simply applied, the change in the time interval between the starting and ending points of the range is not taken into account, with the result that the range indicated by the marks placed in the material data may not correctly be reflected in the playback data.

FIGS. 1A-1C are graphs showing correspondences of clip markers between the material time and the playback time. In FIGS. 1A-1C, marks placed at given positions of the material data are shown as clip markers a, b, c, d and e. FIG. 1A illustrates a case where a playback time is set such that a playback is performed at the same playback rate as the material time. In the example of FIG. 1A, as shown by solid lines, there exit only single playback times a' and b' that correspond to the clip markers a and b of the material time, respectively, while as shown by dotted lines, there also exit only the single material times a and b that correspond to the playback times a' and b', respectively. FIG. 1B illustrates a case where a playback time is set such that a playback is performed with the playback rate of the material time varied. In the example of FIG. 1B, as shown by solid lines, for example, there exist a plurality of playback times d1', d2' and d3' corresponding to the material time denoted by the clip marker d. FIG. 1C illustrates another case where a playback time is set such that a playback is performed with the playback rate of the material time varied. In the example of FIG. 1C, there exists no playback time that corresponds to the material time denoted by the clip marker e. However, even in such a case, there necessarily exits a single material time corresponding to a time of the playback time denoted by, for example, f.

In the case where the material time is the same as the playback time (FIG. 1A), the positions of the playback time correspond to the respective positions of the material time in a one-to-one relationship. In contrast, in the cases where the playback time is set such that the playback is performed with the playback rate of the material time varied as shown in FIGS. 1B and 1C, there may exist a plurality of playback times corresponding to the position of a material time, or no playback time may exit that corresponds to the position of a material time.

As previously stated, in a case where clip markers are used to define a given "range" of the material data and then a time remapping conversion from the material time to the playback time is simply applied, the change in the time interval between the starting and ending points of the range is not taken into account, with the result that the range defined by the clip markers placed in the material data may not correctly be reflected in the playback data. For example, in a case where a range is specified in such a manner that the clip marker d shown in FIG. 1B serves as the starting or ending point of the specified range, the corresponding playback times d1', d2' and d3' can be known indeed but the time change between d1' and d2' and the time change between d2' and d3' are not taken into account. For this reason, it cannot be determined whether or not the ranges between d1' and d2' and between d2' and d3' in the playback time correspond to the range specified in the material time.

Therefore, in a case where the material data is a recorded data of, for example, the TV broadcast of a succor game and a range of a goal scene in the game is specified by use of clip markers, even if the goal scene as specified by use of the clip markers is to be played back, by use of the playback data, after a time remapping conversion process, then it cannot correctly be determined to which range of the playback data as subjected to the time remapping conversion process the range of the goal scene as specified in the material data corresponds, with the result that only a portion of the goal scene may be played back or the goal scene may not be appropriately played back.

Thus, according to the conventional art, it was possible to determine the mutual correspondence between any given "position" in the material data and a "position" at which the given position is reflected in the playback data as subjected to a time remapping conversion process. However, it was difficult to determine the mutual correspondence between any given "range" specified in the material data and a "range" in which the given range specified in the material data is reflected in the playback data as subjected to a time remapping conversion process.

CITATION LIST

Patent Literature

PTL 1: United States Patent Application Publication No. 2008/0253735A

SUMMARY OF INVENTION

The present invention provides an editing apparatus, editing method, editing program and data structure that make it possible to determine the mutual correspondence between any given "range" specified in the material data and a "range" in which the given range specified in the material data is reflected in the playback data as subjected to a time remapping conversion process.

According to an aspect of the invention, an editing method of the invention comprises: generating, from a material data which is generated according to a first time and in which a first time range is specified, a playback data that is to be played back according to a second time different from the first time; and locating a second time range, which includes the material data within the first time range, in the playback data.

For example, in a case where the second time is set such that the playback data includes a reverse playback range of the material data, if the playback data is generated from the material data, a plurality of second time ranges corresponding to the first time range of the material data may appear in the playback data. Even in such a case, according to the invention, the second time range, which includes the material data within the first time range, in the playback data can be located, so that the correspondence between the first time range specified in the material data and the second time range, in which the specified range of the material data is reflected, in the playback data can be determined. The term "first time" used herein means a time axis used when the material data is recorded and corresponds to, for example, the "material time" as described in this specification. The term "second time" used herein means a time axis used during the playback of the playback data and corresponds to, for example, the "playback time" as described in this specification. The same is true with the claims of the subject application and the specification thereof unless any particular explanations are made to the contrary. The terms "material data" and "playback data" include "moving image data", "moving image signals" and "clips" as described in this specification. The same is true with the claims of the subject application and the specification thereof unless any particular explanations are made to the contrary. The material data within the first time range and the playback data within the second time range correspond to, for example, "clip" as described in this specification.

The editing method according to the invention may further comprise displaying, on the user interface, the second time range in the second time or, alternatively, displaying, on the user interface, both the first time range in the first time and the second time range in the second time. As a result, the user can visually recognize a range of playback data in which the first range specified in the material data is reflected.

Moreover, the editing method according to the invention may include a feature that the first time range of the material data includes particular identification information, which is displayed on the user interface when the second time range on the user interface is designated. According to this feature, for example, if a user operates a pointer on the user interface to designate the second time range, then the particular identification information is displayed on the user interface. As a result, the user can visually recognize that the second time range of the playback data the user designates by use of the pointer is a range in which the first time range of the material data is reflected.

The editing method according to the invention may further comprise: associating the first time range in the first time with the second time range in the second time; displaying, on the user interface, the first time range in the first time and the second time range in the second time; changing the manner of the displaying of the second time range associated with the first time range, when the first time range on the user interface is designated; and changing the manner of the displaying of the first time range associated with the second time range, when the second time range on the user interface is designated. According to this feature, for example, if a user operates a pointer on the user interface to designate the first time range of the material data, the user can visually recognize the second time range of the playback data in which the first time range of the material data is reflected. Conversely, if the user operates the pointer on the user interface to designate the second time range of the playback data, the user can visually recognize the first time range of the material data which is reflected in the second time range of the playback data. Changing the manner of the displaying of the first time range or second time range includes, for example, charging the color of the displaying thereof, causing the displaying thereof to flash, increasing or decreasing the size of the displaying thereof, etc.

According to another aspect of the invention, an editing apparatus of the invention comprises a processing part that executes: generating, from a material data which is generated according to a first time and in which a first time range is specified, a playback data that is to be played back according to a second time different from the first time; and locating a second time range, which includes the material data within the first time range, in the playback data.

According to yet another aspect of the invention, a computer program of the invention allows a computer to execute: generating, from a material data which is generated according to a first time and in which a first time range is specified, a playback data that is to be played back according to a second time different from the first time; and locating a second time range, which includes the material data within the first time range, in the playback data.

According to yet another aspect of the invention, a data structure of the invention comprises: a material data which has been generated according to a first time and in which a first time range has been specified; and a playback data which has been generated from the material data and is to be played back according to a second time different from the first time and in which a second time range, which includes the material data within the first time range, has been located.

BRIEF DESCRIPTION OF DRAWINGS

FIG. 6 is a table showing criteria for determining, from differential values and second-order differential values at intersections on a graph, whether reference positions represented by the respective intersections are the starting or ending positions of ranges.

DESCRIPTION OF EMBODIMENTS

Embodiments of the invention will be described in detail below with reference to the drawings.

Figure 1A:
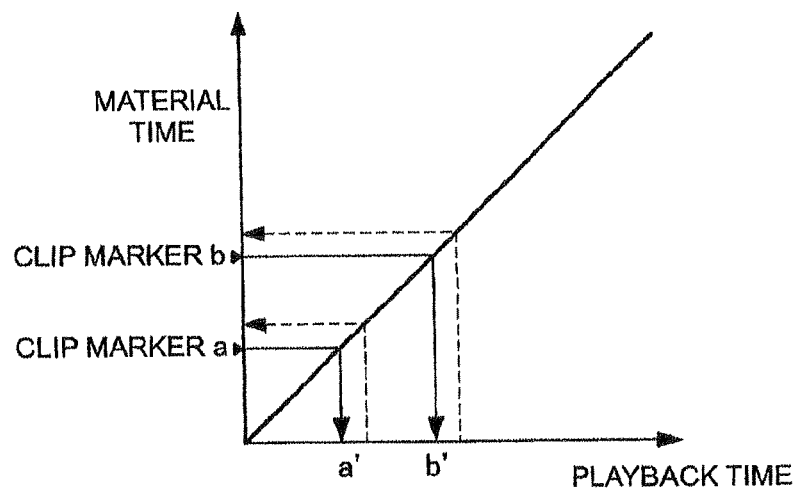
FIG. 1A is a diagram showing the correspondences of clip markers between the material time and the playback time.
Figure 1B:
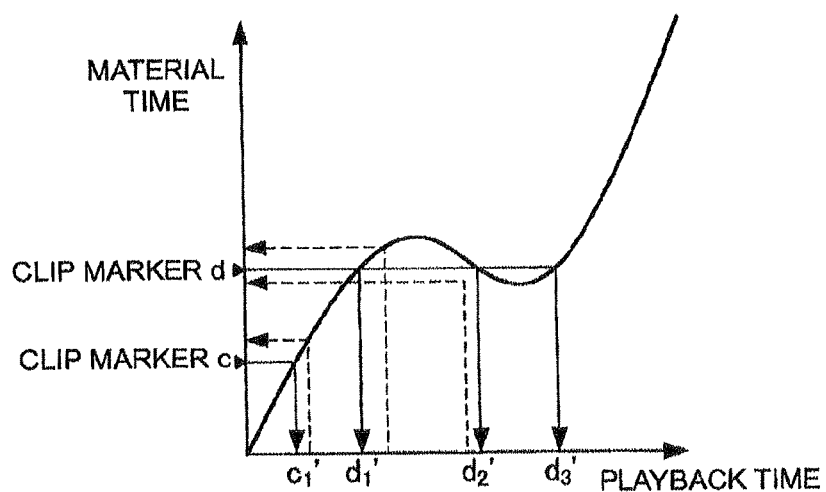
FIG. 1B is a diagram showing the correspondences of clip markers between the material time and the playback time.
Figure 1C:
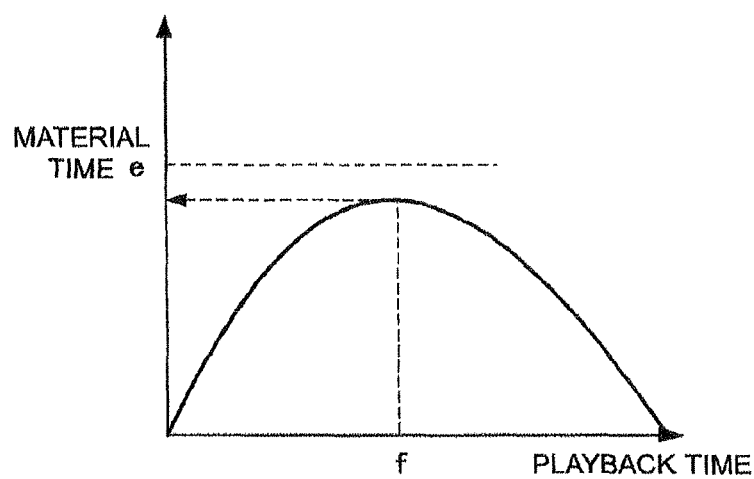
FIG. 1C is a diagram showing the correspondences of clip markers between the material time and the playback time.
Figure 2:
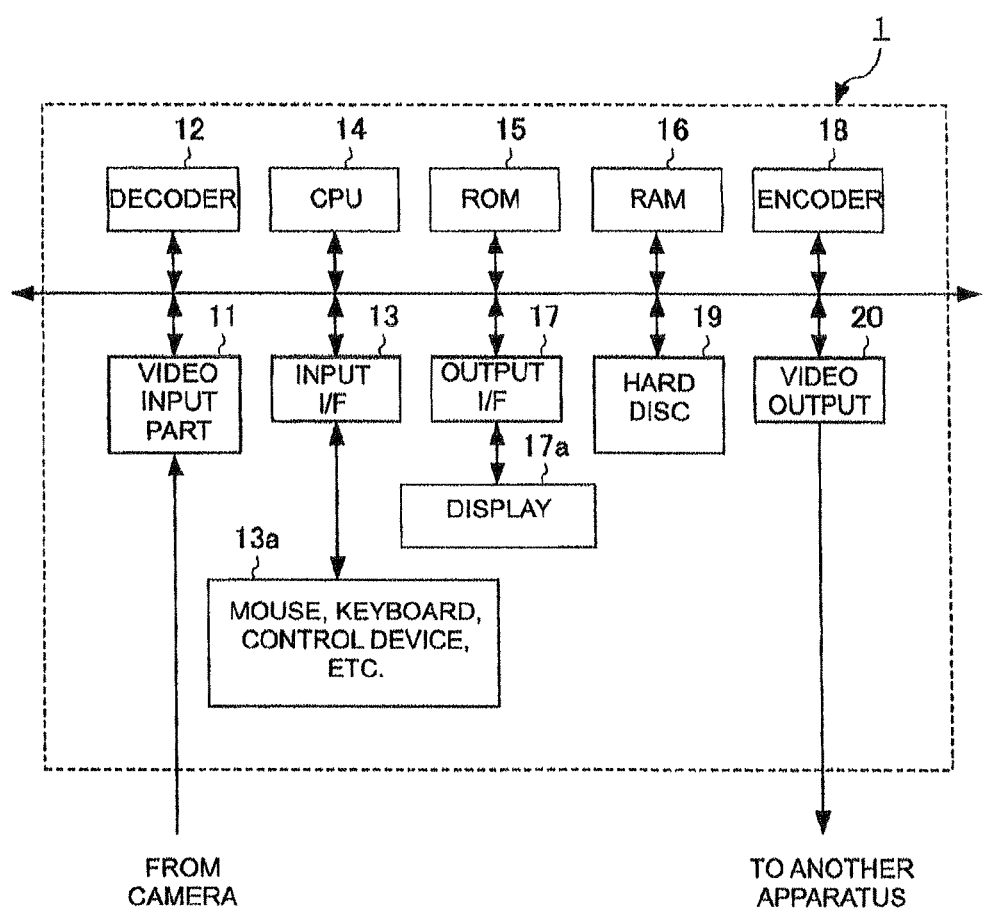
FIG. 2 is a block diagram of a nonlinear editing apparatus according to an embodiment of the invention.

A nonlinear editing apparatus, which is an editing apparatus according to a first embodiment of the invention, will now be described with reference to FIG. 2. As shown in FIG. 2, the nonlinear editing apparatus 1 according to the present embodiment comprises a video input part 11; a decoder 12; an input interface (shown as "INPUT I/F" in this figure) 13; an input part 13a that is a mouse, a keyboard, a control device and/or the like; a CPU (Central Processing Unit) 14; a ROM (Read Only Memory) 15; a RAM (Random Access Memory) 16; an output interface (shown as "OUTPUT I/F" in this figure) 17; a display 17a; an encoder 18; a hard disc 19; and a video output part 20.

The video input part 11 receives, for example, video data from a camera or the like. The decoder 12 decodes the video data from the video input part 11. The input interface 13 receives user instructions entered by operating the input part 13a that is the mouse, keyboard, control device and/or the like. The CPU 14 receives the user instructions via the input interface 13 and controls all of the processings executed by the nonlinear editing apparatus 1. The ROM 15 stores information, such as various application programs to be executed by the CPU 14; screen data including an edition screen, various standby screens and the like; default data that are initial setting data of various functions. The RAM 16 is used as a working memory of the CPU 14. The output interface 17 outputs, under control of the CPU 14, video as processed and other information to the display 17a. The encoder 18 encodes the video data as processed by the CPU 14, and the video output part 20 outputs the video data as encoded by the encoder 18 to another apparatus. The hard disc 19 can store video as processed by the CPU 14, video received from the video input part 11, and other information. In the present embodiment of the invention, the CPU 14 functions as a processing part.

Processings to be executed by the nonlinear editing apparatus 1 according to the present embodiment will now be described. Specifically, locating from a material time range a corresponding playback time range and locating from a playback time range a corresponding material time range will be described in detail.

<1. Locating, from Material Time Ranges, the Corresponding Playback Time Ranges>

Figure 3:
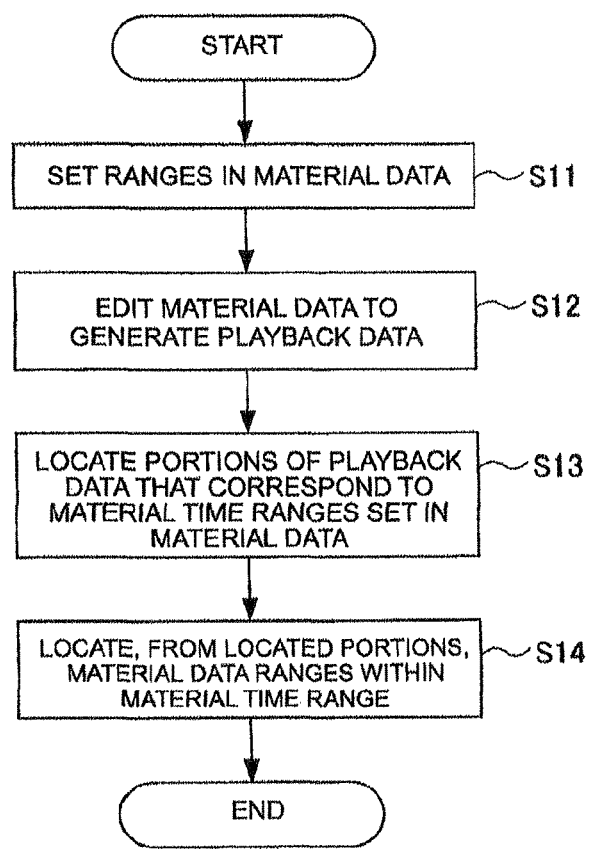
FIG. 3 is a flowchart illustrating processings executed by the nonlinear editing apparatus of FIG. 2.
Figure 4:
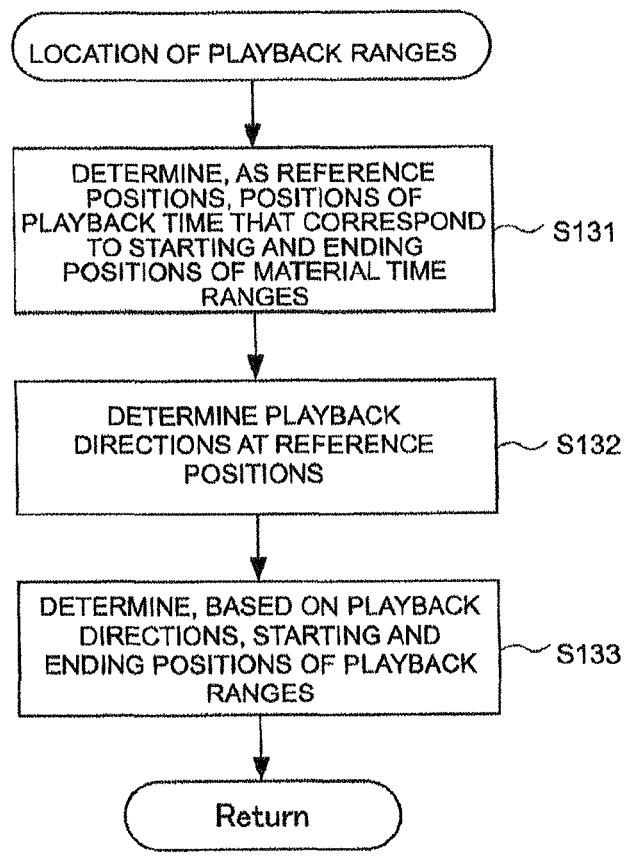
FIG. 4 is a flowchart illustrating, in detail, the processing in Step S13 of FIG. 3.
Figure 5:
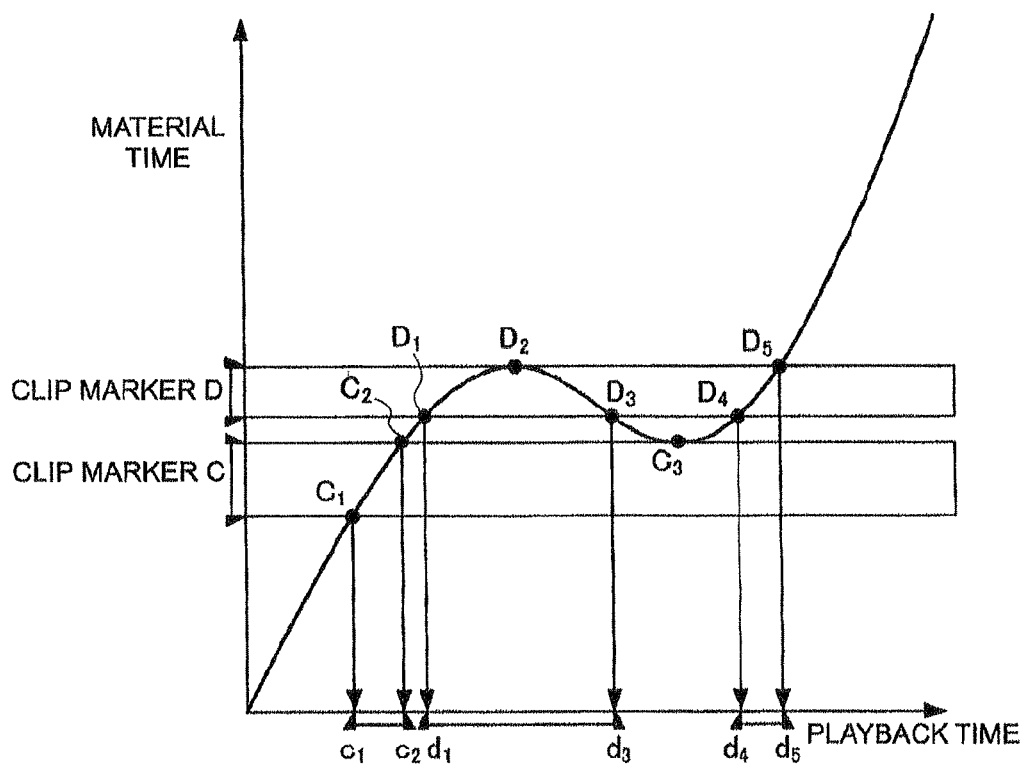
FIG. 5 is a diagram illustrating a principle on which the nonlinear editing apparatus of FIG. 2 locates, from material time ranges, the corresponding playback time ranges.

It will now be described, with reference to FIG. 2 and FIGS. 3-5, how the nonlinear editing apparatus 1 according to the present embodiment locates, from material time ranges, the corresponding playback time ranges. FIGS. 3 and 4 are flowcharts illustrating how the nonlinear editing apparatus 1 according to the present embodiment locates from material time ranges the corresponding playback time ranges, while FIG. 5 is a diagram illustrating a principle on which the nonlinear editing apparatus 1 locates from material time ranges the corresponding playback time ranges, and showing, as one example, a case where clip markers are used to define ranges C and D. The processings described below are performed under control of the CPU 14. It is assumed that a material data has already been stored in the hard disc 19.

As shown in FIG. 3, to begin with, one or more ranges are set in the material data (Step S11). Specifically, the input part 13a is operated by a user, and in accordance with user's instructions received via the input interface 13, the CPU 14 sets, for example, ranges C and D in the material data by use of clip markers. The CPU 14 associates the clip marker information of the ranges C and D set by use of the clip markers with the material data already stored in the hard disc 19 and stores the associated clip marker information in the hard disc 19.

Next, the material data is edited to generate playback data (Step S12). Specifically, the input part 13a is operated by the user, and in accordance with user's instructions received via the input interface 13, the CPU 14 subjects the material data stored in the hard disc 19 to a time remapping edition for generating the playback data obtained by playing back the material data according to a playback time ("second time") the time axis of which is different from the time axis of the material data ("material time" or "first time"); adds the corresponding playback rate information and the like to the material data; and generates the playback data. The CPU 14 need not actually copy or cut the material data and may associate the editing information with the material data stored in the hard disc 19 and store the associated editing information in the hard disc 19.

Next, portions of the playback data that correspond to the material time ranges set in the material data are located (Step S13). In the example of FIG. 4, based on the material data, clip marker information and editing information stored in the hard disc 19, the CPU 14 locates, in the playback data, a range $c_1$-$c_2$ as a portion corresponding to the range C set in the material data by use of the clip markers and ranges $d_1$-$d_3$ and $d_4$-$d_5$ as portions corresponding to the range D also set in the material data by use of the clip markers.

Locating the portions of the playback data that correspond to the ranges set in the material data by use of the clip markers (Step S13) will now be described in detail with reference to FIG. 4.

First, the CPU 14 determines, as reference positions, positions of the playback time that correspond to the starting and ending positions of the material time ranges (Step S131).

The CPU 14 executes this processing by calculating a relationship between the material time and the playback time according to a function depicted as a curve in FIG. 5. The material data is exactly not continuous and is constituted by a plurality of frames spaced by given intervals. For those portions of the ranges C and D in which no frames exist, the CPU 14 uses line segment interpolation to perform the calculation for a linearly changing portion, while using Bezier interpolation to perform the calculation for a portion that changes at a high curvature. Thus, in Step S13, the CPU 14 determines all of the points, at which the starting position of the range C intersects the graph of the interpolation values of the key frames, to obtain a reference position C1, while determining all of the points, at which the starting position of the range D intersects the graph of the interpolation values of the key frames, to obtain reference positions D1, D3 and D4. The CPU 14 then determines all of the points, at which the ending position of the range C intersects the graph of the interpolation values of the key frames, to obtain reference positions C2 and C3, while determining all of the points, at which the ending position of the range D intersects the graph of the interpolation values of the key frames, to obtain reference positions D2 and D5.

Next, the CPU 14 determines the playback directions of the material time at the respective reference positions (Step S132).

For executing this processing, the CPU 14 calculates differential values and second-order differential values for all of the obtained reference positions C1, D1, D3, D4, C2, D2, C3 and D5, and determines, based on whether the differential values and second-order differential values are positive or not, the playback directions at the respective reference positions.

Then, the CPU 14 determines, based on the thus determined playback directions, the starting and ending positions of the playback ranges in the playback time (Step S133).

FIG. 6 shows a table for use in determining, based on the differential values and second-order differential values at the intersections on the graph, whether the reference positions represented by the respective intersections are starting or ending positions.

In accordance with this table, the "starting position" and "ending position" of each "playback range" are determined for all of the intersections. If an intersection is the "starting position" of the "playback range", then it is determined that the positions from the "starting position" to the next intersection are "insides of the playback range", while if an intersection is the "ending position" of the "playback range", then it is determined that the positions from the "ending position" to the next intersection are "outsides of the playback range". For the last intersection, there exists no next intersection, so that the terminating position of the graph is used. This determination is repeated until the last intersection, thereby obtaining sets of "insides of the playback range". It should be noted that for the sets of "insides of the playback range" thus obtained, if any ranges are adjacent to each other, the corresponding sets are coupled to each other. In this way, it is possible to locate the ranges of the playback data (playback range) in which the ranges specified in the material data are reflected.

As a concrete example, locating, from the material time ranges of the clip markers C and D, the corresponding playback ranges will be described below.

<1-1. Locating, from a Material Time Range of Clip Marker Range C, the Corresponding Playback Time Range>

First, a point, at which the starting position of the clip marker range C intersects the graph of interpolation values of the key frames, is determined and denoted as C1. Next, the differential value of the intersection C1, that is, a gradient of the graph at the intersection C1 is determined. The differential value of the intersection C1 is positive and hence greater than zero, which means that the playback direction at the intersection C1 is the positive direction of the material time. The intersection C1 corresponds to the "starting position" of the clip marker range C and its differential value is positive, so that the corresponding playback time is recognized as the starting position c1 of the "playback range".

Next, points, at which the ending position of the clip marker range C intersects the graph of interpolation values of the key frames, are determined and denoted as C2 and C3.

The differential value of the intersection C2 is determined first. The differential value of the intersection C2 is positive and hence greater than zero, which means that the playback direction at the intersection C2 is the positive direction of the material time. The intersection C2 corresponds to the "ending position" of the clip marker range C and its differential value is positive, so that the corresponding playback time is recognized as the ending position c2 of the "playback range".

Next, the differential value of the intersection C3 is determined. The differential value of the intersection C3 is zero, which means the intersection C3 is a local maximum or a local minimum. In order to make it possible to determine whether the intersection C3 is a local maximum or a local minimum, the second-order differential value of the intersection C3 is determined. The second-order differential value of the intersection C3 is positive and hence greater than zero, which clarifies that the intersection C3 is a local minimum. The intersection C3 corresponds to the ending position of the clip marker range C and its second-order differential value is positive and hence the intersection C3 is a local minimum, so that the corresponding playback time is recognized as the ending position c3 (not shown) of the "playback range".

The positions c1, c2 and c3 are rearranged in ascending order of the playback time. The positions c1 to c2 are inside the range, the positions c2 to c3 are outside the range, and the position c3 to the position corresponding to the graph terminal are outside the range. As a result, a playback range c1-c2, the starting position of which is c1 and the ending position of which is c2, is located as a range of playback data in which the range C specified in the material data is reflected.

<1-2. Locating, from a Material Time Range of Clip Marker Range D, the Corresponding Playback Time Ranges>

First, points, at which the starting position of the clip marker range D intersects the graph of interpolation values of the key frames, are determined and denoted as D1, D3 and D4.

Next, the differential value of the intersection D1 is determined. The differential value of the intersection D1 is positive and hence greater than zero, which means that the playback direction at the intersection D1 is the positive direction of the material time. The intersection D1 corresponds to the "starting position" of the clip marker range D and its differential value is positive, so that the corresponding playback time is recognized as the starting position d1 of the "playback range".

Then, the differential value of the intersection D3 is determined. The differential value of the intersection D3 is negative and hence smaller than zero, which means that the playback at the intersection D3 represents a playback in the reverse direction of the material time. The intersection D3 corresponds to the "starting position" of the clip marker range D and its differential value is negative, so that the corresponding playback time is recognized as the ending position d3 of the "playback range".

Then, the differential value of the intersection D4 is determined. The differential value of the intersection D4 is positive and hence greater than zero, which means that the playback direction at the intersection D4 is the positive direction of the material time. The intersection D4 corresponds to the "starting position" of the clip marker range D and its differential value is positive, so that the corresponding playback time is recognized as the starting position d4 of the "playback range".

Next, points, at which the ending position of the clip marker range D intersects the graph of interpolation values of the key frames, are determined and denoted as D2 and D5.

The differential value of the intersection D2 is determined. The differential value of the intersection D2 is zero, which means the intersection D2 is a local maximum or a local minimum. Then, in order to determine whether the intersection D2 is a local maximum or a local minimum, the second-order differential value of the intersection D2 is determined. The second-order differential value of the intersection D2 is negative and hence smaller than zero, which clarifies that the intersection D2 is a local maximum. The intersection D2 corresponds to the "ending position" of the clip marker range D and its second-order differential value is negative and hence the intersection D2 is a local maximum, so that the corresponding playback time is recognized as the starting position d2 (not shown) of the "playback range".

Then, the differential value of the intersection D5 is determined. The differential value of the intersection D5 is positive and hence greater than zero, which means that the playback direction at the intersection D5 is the positive direction of the material time. The intersection D5 corresponds to the "ending position" of the clip marker range D and its differential value is positive, so that the corresponding playback time is recognized as the ending position d5 of the "playback range".

Then, the positions d1 to d5 thus obtained are rearranged in ascending order of the playback time. The positions d1 to d2 are inside the range, the positions d2 to d3 are inside the range, the positions d3 to d4 are outside the range, the positions d4 to d5 are inside the range, and the position d5 to the position corresponding to the graph terminal are outside the range. The ranges d1-d2 and d2-d3 are adjacent to each other and hence are coupled to each other. As a result, a playback time range d1-d3, the starting position of which is d1 and the ending position of which is d3, and a playback time range d4-d5, the starting position of which is d4 and the ending position of which is d5, are located as ranges of the playback data in which the range D specified in the material data is reflected.

<2. Locating, from Playback Time Ranges, the Corresponding Material Time Ranges>

Figure 7:
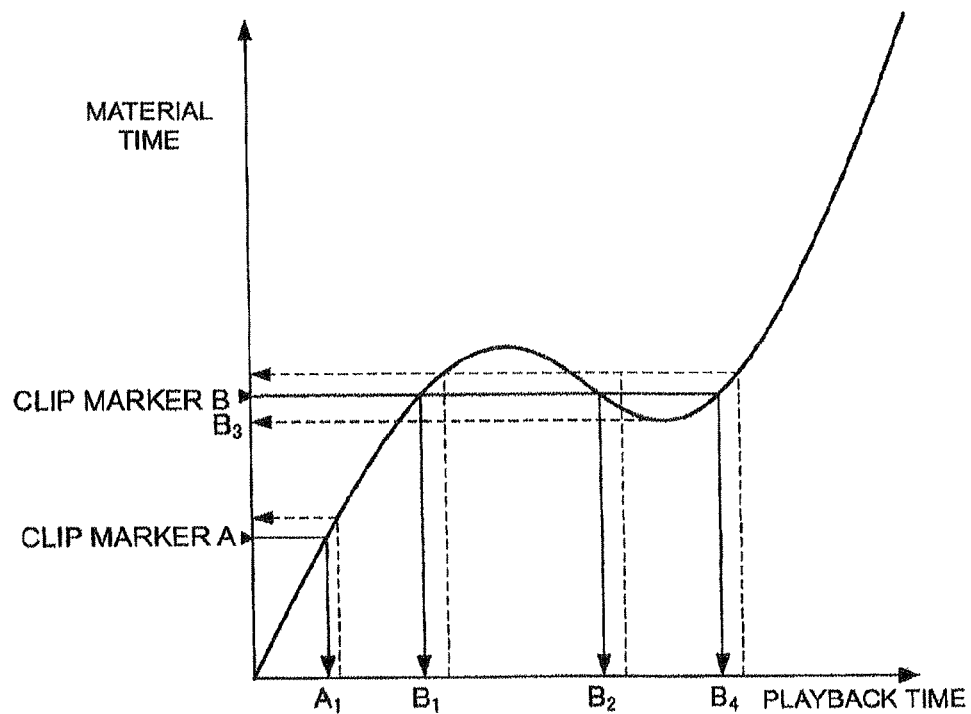
FIG. 7 is a diagram illustrating a principle on which the nonlinear editing apparatus of FIG. 2 locates, from playback time ranges, the corresponding material time ranges.

Locating, from playback time ranges, the corresponding material time ranges by use of the nonlinear editing apparatus 1 according to the present embodiment will now be described with reference to FIGS. 2, 3 and 7. FIG. 7 is a diagram illustrating a principle of locating, from playback time ranges, the corresponding material time ranges. It is assumed that a material time range has been specified by use of clip markers A and B and that video data that is material (which will be referred to as "material data" hereinafter) has already been stored in the hard disc 19. The processings described below are performed under control of the CPU 14.

As a precondition for locating, from playback time ranges, the corresponding material time ranges, it is necessary that locating, from the material time ranges, the corresponding playback time ranges as described above have already been done. This location is just what was done in Steps S11-S13 described above with reference to FIG. 3. The present example will now be explained as to a case where, as shown in FIG. 7, the input part 13a is operated by the user and the CPU 14 sets, in response to user's instructions received via the input interface 13, for example, a clip marker in-point A and a clip marker out-point B in the material data. The CPU 14 associates clip marker information of the clip marker in-point A and out-point B and the like with the material data already stored in the hard disc 19 and then stores the associated clip marker information in the hard disc 19. In this way, the range between the clip markers A and B in the material time is specified as a material time range (first time range).

Subsequently to Step S13, the material data ranges within the material time range set in Step S11 are located, from the portions located in Step S13, based on the time changes of the material data (Step S14). The relationship between the material time (the time axis of the material data) and the playback time (the time axis of the playback data) is shown in FIG. 7. In the example of FIG. 7, the CPU 14 locates, based on the material data, clip marker information and editing information stored in the hard disc 19, ranges $A_1$-$B_1$ and $B_2$-$B_4$ in the playback data as the portions corresponding to the range set in the material data by use of the clip markers A and B, and further locates, as the material data ranges within the material time range, ranges defined by the minimum and maximum values of the material time in those located ranges. More specifically, the minimum value of the material time in a located range, that is, the shortest elapsed time is recognized as the starting position of a material data range within the material time range, while the maximum value of the material time, that is, the longest elapsed time is recognized as the ending position of a material data range within the material time range.

The CPU 14 can execute the processings described above by calculating the material time and playback time in accordance with the function depicted as a curve in FIG. 7. The material data is exactly not continuous and is constituted by a plurality of frames spaced by predetermined intervals. It is assumed that frames specified by the clip marker in-point A and out-point B are key frames A and B. As to those portions of the ranges $A_1$-$B_1$ and $B_2$-$B_4$ in which no key frames exist, the CPU 14 uses, for example, line segment interpolation to calculate interpolation values for a linearly changing portion, while using, for example, Bezier interpolation to calculate interpolation values for a portion that changes at a high curvature. Then, the CPU 14 locates, as the material data ranges, ranges between the minimum and maximum values of the material time taken by the interpolation values of key frames $A_1$, $B_1$, $B_2$ and $B_4$. This will be explained in more detail with reference to the example shown in FIG. 7. A range $A_1$-$B_1$ (second time range) in the playback time includes the whole material time range A-B in the material time; a range $B_2$-$B_4$ (second time range) in the playback time includes a material data range $B_3$-B that is a part of the material time range A-B in the material time. According to the processing of the present embodiment, it can be determined that the range $A_1$-$B_1$ in the playback time reflects the material data range A-B in the material time and that the range $B_2$-$B_4$ in the playback time reflects a material data range $B_3$-B in the material time.

It should be noted that although the present embodiment is described as calculating interpolation values by use of line segment interpolation and Bezier interpolation, the present invention is not limited to this embodiment. It is apparent that any other interpolation method, if it can be regarded as preferable in implementation, may be used instead. For example, spline interpolation may be used as such another interpolation method.

An example of line segment interpolation and Bezier interpolation to be executed by the CPU 14 will now be described. First, the mathematical expression of line segment interpolation is as follows:

$$\text{Material Time} = (\text{key2\_value} - \text{key1\_value}) * (\text{pos} - \text{key1\_pos}) / (\text{key2\_pos} - \text{key1\_pos}) + \text{key1\_value} \quad (1)$$

where "pos" is a playback time position; key1 is a neighbor key frame preceding the playback time position; key1_pos is the playback time position of key1; key1_value is the material time position of key1; key2 is a neighbor key frame following the playback time position; key2_pos is the playback time position of key2; and key2_value is the material time position of key2.

Next, the mathematical expressions of Bezier interpolation are as follows:

$$\text{Playback time} = t^3 * \text{key2\_pos} + 3 * t^2 * (1-t) * \text{ctrl2\_pos} + 3 * t * (1-t)^2 * \text{ctrl1\_pos} + (1-t)^3 * \text{key1\_pos};$$

$$\text{Material time} = t^3 * \text{key2\_value} + 3 * t^2 * (1-t) * \text{ctrl2\_value} + 3 * t * (1-t)^2 * \text{ctrl1\_value} + (1-t)^3 * \text{key1\_value} \quad (2)$$

where t is a parameter; ctrl1 is a control point 1 of Bezier; ctrl1_pos is the playback time position of ctrl1; ctrl1_value is the material time position of ctrl1; ctrl2 is a control point 2 of Bezier; ctrl2_pos is the playback time position of ctrl2; and ctrl2_value is the material time position of ctrl2.

Using the above line segment interpolation and Bezier interpolation, the CPU 14, in Step S13, locates, from the material data range defined by the clip markers A and B, that is, from the material time range, both the portion defined by the key frames $A_1$ to $B_1$ and the portion defined by the key frames $B_2$ to $B_4$ as playback data ranges including the material data within that material time range. Subsequently, in Step S14, the CPU 14 recognizes a position, at which the material time exhibits the minimum value in each of the portions defined by the key frames $A_1$ to $B_1$ and key frames $B_2$ to $B_4$ of the corresponding playback data, as the starting position of the respective material data range, and further recognizes a position, at which the material time exhibits the maximum value in each of the portions defined by the key frames $A_1$ to $B_1$ and key frames $B_2$ to $B_4$ of the corresponding playback data, as the ending position of the respective material data range. In this way, the material data ranges A-B and $B_3$-B are located which correspond to the playback data ranges $A_1$-$B_1$ and $B_2$-$B_4$, respectively.

Figure 8A:
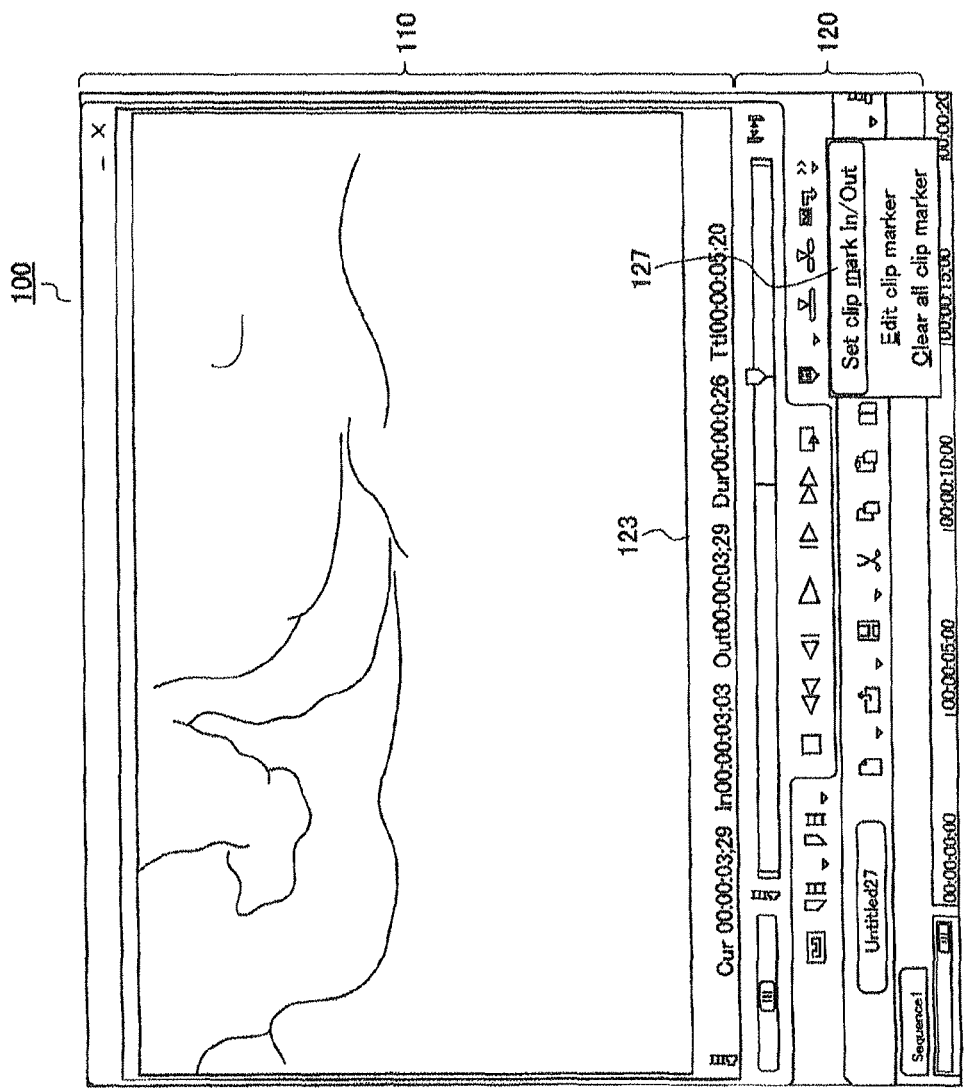
FIG. 8A is a diagram for illustrating a time remapping operation using an editing apparatus having a clip marker function.
Figure 8B:
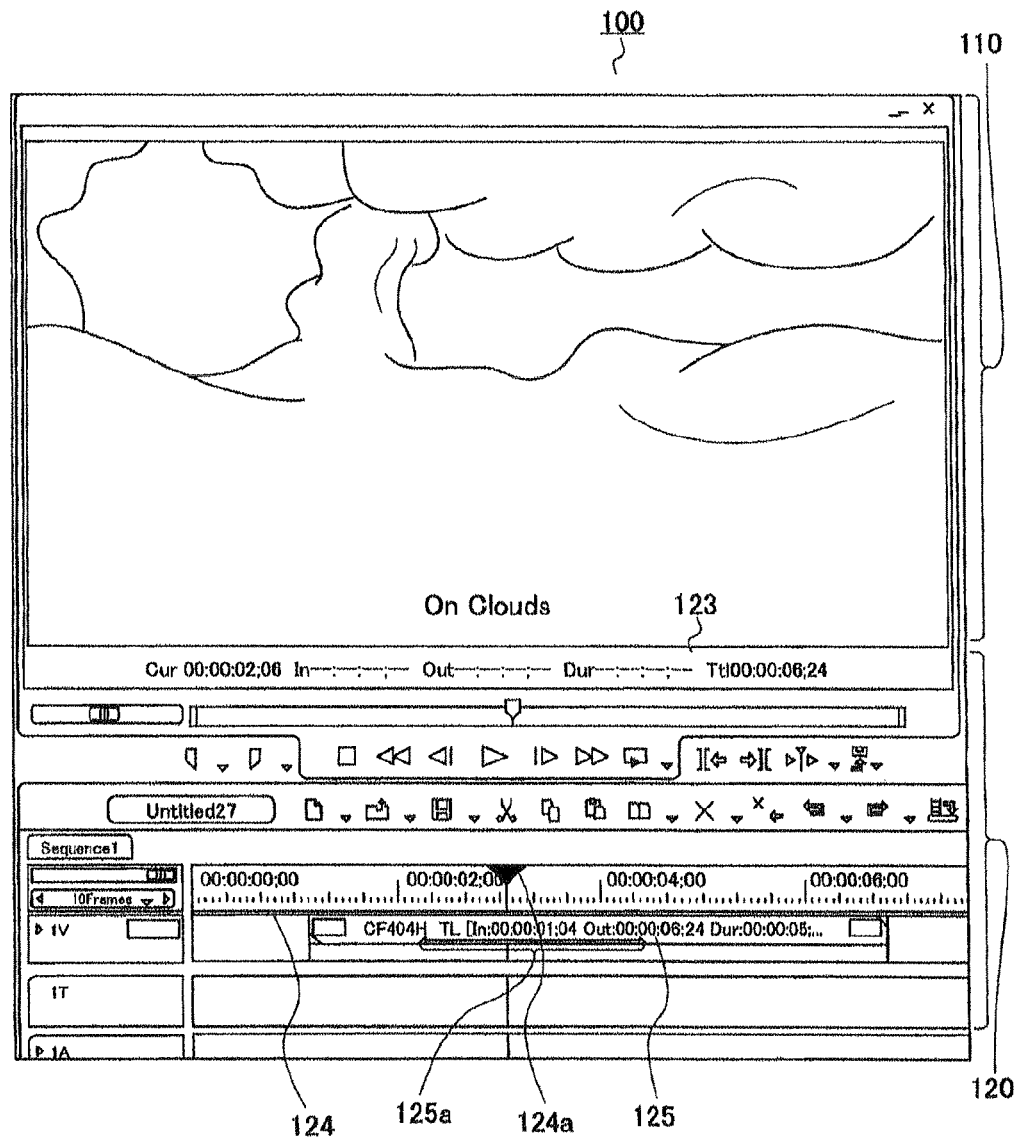
FIG. 8B is a diagram for illustrating the time remapping operation using the editing apparatus having the clip marker function.
Figure 8C:
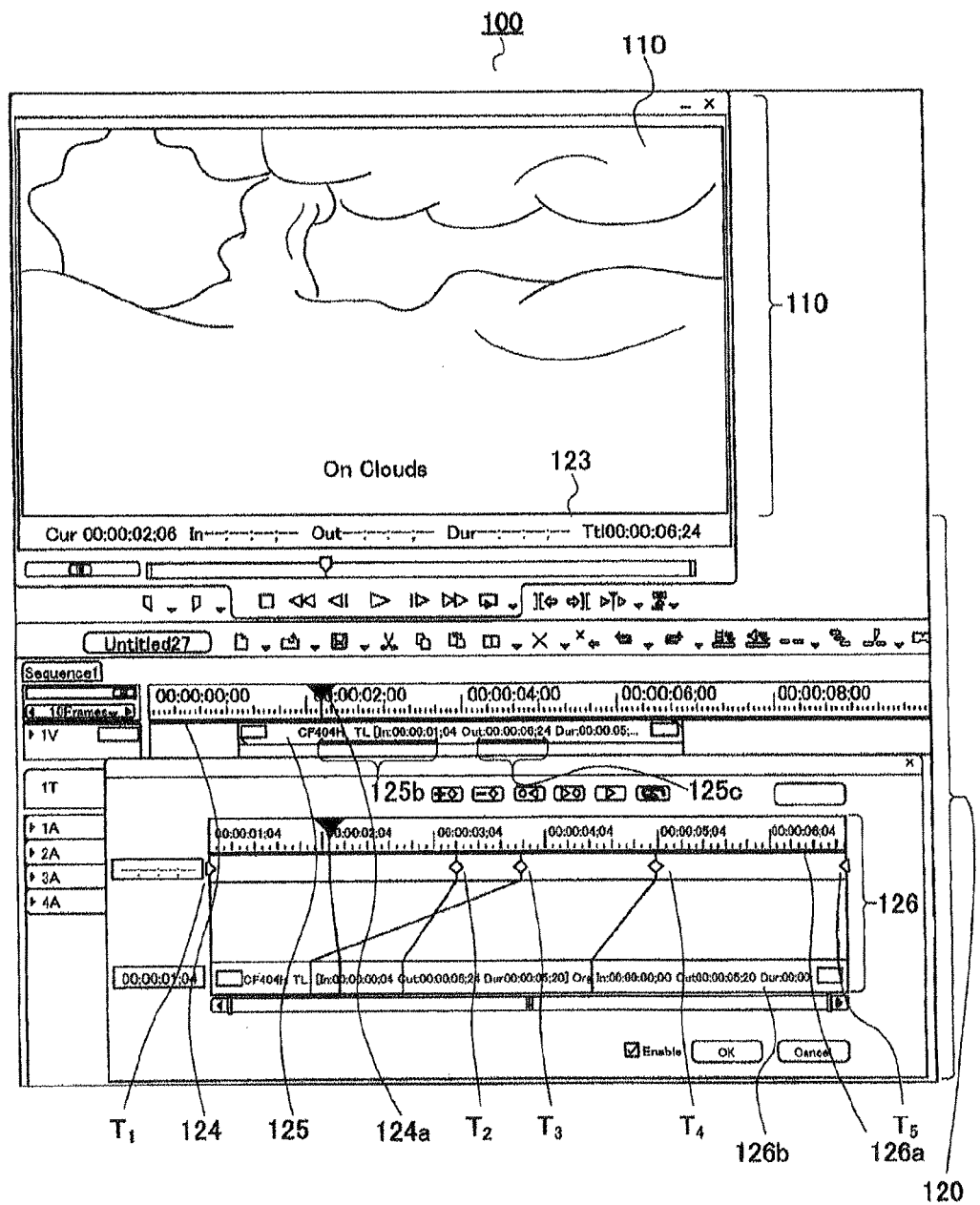
FIG. 8C is a diagram for illustrating the time remapping operation using the editing apparatus having the clip marker function.

Display screens to be displayed on the display 17a when a user operates the nonlinear editing apparatus 1 for editions will now be described with reference to FIGS. 8A-8C. The screens to be displayed on the display 17a transition, with the progress of the editing operation, as shown in FIGS. 8A-8C. The processings described below are executed, basically, by the CPU 14 that receives user's instructions and the like entered via the input interface 13 and reads application programs, video data and the like stored in the ROM 15.

FIG. 8A illustrates a situation in which a control screen 120 is operated to display a menu window 127. As shown in FIG. 8A, a display screen 100 displayed on the display 17a comprises an image screen 110 and the control screen 120. In the control screen 120, a status screen 123 is displayed which shows current settings. If the menu window 127 is operated to click a clip mark setting ("Set clip mark In/Out"), the display screen is changed to a display screen as shown in FIG. 8B, in which editing operations using clip markers and time remapping can be started.

In FIG. 8B, in addition to the status screen 123 that indicates the current settings, a time line 124 that indicates the playback time of the material time, a time line cursor 124a and a clip marker 125 are displayed in the control screen 120. FIG. 8B illustrates a situation in which the clip marker 125, with which the user sets an in-point (In) and an out-point (Out) to specify a material time range 125a, is arranged on the time line 124 and further the time line cursor 124a is currently operated by the user. In the example shown in FIG. 8B, it is arranged that the material time range 125a specified as described above include, as its particular identification information, textual information of "On Clouds" and that if the time line cursor 124a designates the material time range 125a, "On Clouds" be displayed on the image screen 110. As a result, the user can visually recognize that this image is an image of the material time range 125a specified by the clip marker 125.

FIG. 8C shows a working screen, which is used for the user to perform time remapping, and illustrates a situation in which a time remapping setting screen 126 appears in addition to the time line 124 and clip marker 125. The time remapping setting screen 126 comprises a time line bar 126a that indicates the playback time after the time remapping, and a setting bar 126b that indicates settings made to the time line bar 126a.

Figure 9:
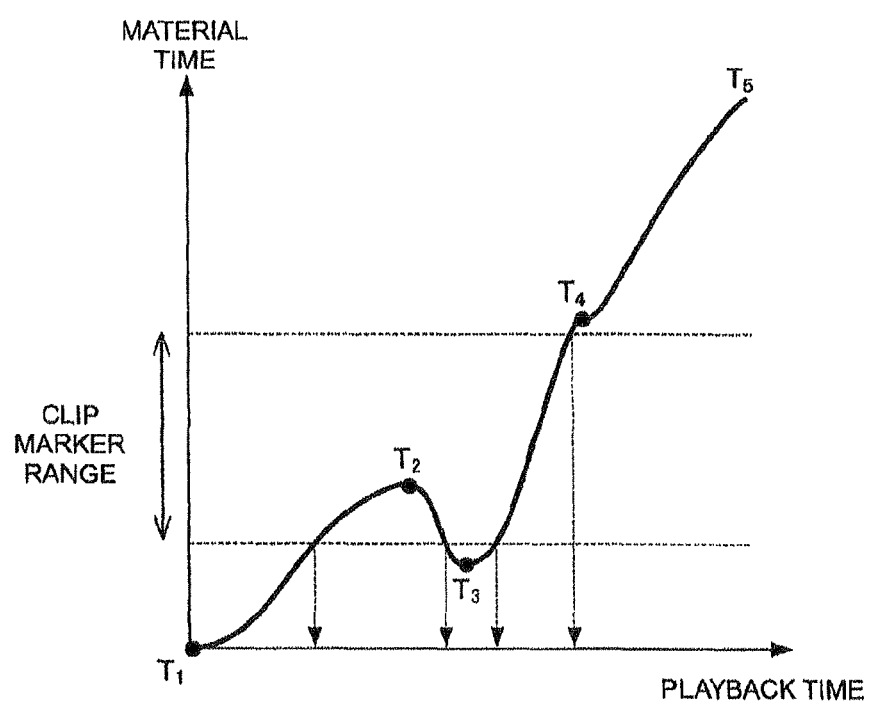
FIG. 9 is a graph illustrating a correspondence of a clip marker between the material time and the playback time, which corresponds to a display screen shown in FIG. 8C.

FIG. 9 is a graph that illustrates a correspondence of the clip marker between the material time and the playback time and that corresponds to the display screen shown in FIG. 8C. It can be seen from FIG. 9 that changing the edition rate by use of the time remapping setting screen 126 causes curves to occur in the graph due to the time remapping.

The material time range 125a of the material data set in the clip marker 125 is shown as two playback time ranges 125b and 125c on the time line 124 displayed in the display screen after the time remapping edition shown in FIG. 8C. Also in this screen, it is arranged that if the time line cursor 124a designates the playback time ranges 125b and 125c, "On Clouds" be displayed in the image screen 110. As a result, the user can visually recognize that this image is an image within the material time range 125a specified by use of the clip marker 125.

Thus, the nonlinear editing apparatus 1 according to the present embodiment generates, from a material data which is generated according to a material time that is a first time and in which a material time range that is a first time range is specified, a playback data, which is to be played back according to a playback time that is a second time different from the material time, and locates a playback time range, which includes the material data within the material time range, in the playback data. For example, in a case of setting the playback time such that the playback data includes a reverse playback range that is a range in which the material data is played back in a direction opposite to the playback direction of the material data, if the playback data is generated from the material data, a plurality of playback time ranges corresponding to a material time range of the material data may appear in the playback data. For example, as shown in FIG. 8C, the two playback time ranges 125b and 125c may appear which correspond to the material time range 125a shown in FIG. 8B. Even in such a case, according to the nonlinear editing apparatus 1 of the present embodiment, the playback time ranges 125b and 125c, which include the material data within the material time range 125a, in the playback data can be located, so that the correspondence between the material time range specified in the material data and each of the playback time ranges, in which that material time range is reflected, in the playback data can be determined.

The nonlinear editing apparatus 1 according to the present embodiment may be adapted to display, on the user interface, the playback time range (the playback time ranges 125b and 125c of FIG. 8C) in the playback time or, alternatively, both the material time range in the material time (the material time range 125a of FIG. 8B) and the playback time range (the playback time ranges 125b and 125c of FIG. 8C) in the playback time. As a result, the user can visually recognize the playback data range in which the material data range specified in the material data is reflected.

Moreover, the nonlinear editing apparatus 1 according to the present embodiment may be adapted such that the material time range of the material data includes particular identification information, which is displayed on the user interface, like "On Clouds" is displayed on the image screen 110 as shown in FIGS. 8B and 8C, when the playback time range on the user interface is designated. According to this arrangement, for example, if the user operates a pointer on the user interface to designate the playback time range, the particular identification information is displayed on the user interface. As a result, the user can visually recognize that the playback time range of the playback data which the user designates by use of the pointer is a range in which the material time range of the material data is reflected.

The nonlinear editing apparatus 1 according to the present embodiment may be adapted to associate the material time range 125a in the material time with the playback time ranges 125b and 125c in the playback time in response to an operation of the time remapping setting screen 126 of FIG. 8C; display, on the user interface, the material time range 125a in the material time and the playback time ranges 125b and 125c in the playback time; change the manner of the displaying of the playback time ranges 125b and 125c, with which the material time range 125a has been associated, when the material time range 125a on the user interface is designated; and change the manner of the displaying of the material time range 125a associated with the playback time ranges 125b and 125c when the playback time ranges 125b and 125c on the user interface are designated.

As a result, according to the nonlinear editing apparatus 1 of the present embodiment, for example, if the user operates the pointer on the user interface to designate a material time range of material data, the user can visually recognize a playback time range of playback data in which the material time range of the material data is reflected. If the user operates the pointer on the user interface to designate a playback time range of the playback data, the user can visually recognize a material time range of the material data which is reflected in the playback time range of the playback data. In a case of changing the manner of the displaying of the material time range or playback time range, for example, the color of the displaying thereof may be changed, the displaying thereof may be caused to flash, or the size of the displaying thereof may be increased or decreased.

As previously described, there is no need to actually copy or cut video data to be edited, that is, material data, but editing information may be associated with the material data stored in the hard disc 19 and then stored therein, so that a combination of the editing information and the material data stored in the hard disc 19 can be a playback data.

Therefore, the data structure of the data according to the present embodiment, for example, if including the material data and editing information, comprises: the material data which has been generated according to a first time, that is, a material time and in which a first time range, that is, a material time range has been specified; and the playback data which has been generated from the material data and is to be played back according to a second time, that is, a playback time different from the material time and in which a second time range, that is, a playback time range, which includes the material data within the material time range, has been located.

Such data structure may be adapted such that the material time range of the material data includes particular identification information used for identifying the material time range, for example, like "On Clouds". As a result, a computer or the like may be used to execute displaying, on the user interface, such particular identification information, for example, like "On Clouds" displayed on the image screen 110 as shown in FIGS. 8B and 8C, when, for example, the material time range or playback time range is designated on the user interface.

Moreover, such data structure may be adapted such that a computer can execute: associating a material time range in the material time with a playback time range in the playback time as done in the time remapping setting screen 126 of FIG. 8C; changing the manner of the displaying of the playback time range with which the material time range is associated when the material time range on the user interface is designated; and changing the manner of the displaying of the material time range associated with the playback time range when the playback time range on the user interface is designated.

The above detailed descriptions were made as to preferable embodiments of the invention. However, the invention is not limited to those particular embodiments, and various modifications and variations may be contrived within the scope of the invention described in the claims. In the embodiments of the invention described above, the display screen displayed on the display 17a was used as the user interface, but the invention is not limited to these embodiments and various other embodiments may be used instead. Moreover, the editing apparatus according to the invention may be operated by use of an editing program that allows a general-purpose computer including a CPU and a memory to function as the various means described above. Such an editing program may be distributed via a communication line or may be written into a recording medium such as CD-ROM or the like for distribution.

The invention claimed is:

1. An editing method, comprising:
setting one or more time ranges in material data to be edited, the material data having been generated according to a first time axis of material time;
subjecting the material data to a time remapping for generating playback data that is to be played according to a second time axis of playback time different from the first time axis, the time remapping being such that a plurality of second time ranges corresponding to a first time range of the one or more time ranges may appear in the playback data;

associating editing information with the material data;

storing the associated editing information along with the material data; and generating playback data that is to be played back from the material data and the stored associated editing information, wherein the generating comprises locating a second time range, which includes the material data within the first time-range, in the playback data, wherein generating the playback data that is to be played back includes:

calculating a relationship between the material time and the playback time according to a function depicted as a curve by graphing interpolation values of key frames;

determining, as reference positions, positions of the playback time that correspond to the starting and ending positions of the one or more time ranges in the material data, by determining all of the points at which the starting position and the ending position of the set one or more ranges intersect the graph of the interpolation values of the key frames; and determining a playback direction of the material time at the respective reference positions by differentiation of the calculated relationship.

2. The editing method according to claim 1, further comprising displaying, on a user interface, said second time range in said second time axis.

3. The editing method according to claim 2, wherein:

said first time range of said material data includes particular identification information; and said method further comprises displaying, on said user interface, said particular identification in when said second time range on said user interface is designated.

4. The editing method according to claim 2, further comprising:

associating said first time range in said first time axis with said second time range in said second time axis;

displaying, on said user interface, said first time range in said first time axis and said second time range in said second time axis;

changing the manner of the displaying of said second time range associated with said first time range, when said first time range on said user interface is designated; and changing the manner of the displaying of said first time range associated with said second time range, when said second time range on said user interface is designated.

5. An editing apparatus, comprising:

a processing part configured to:

set one or more time ranges in material data to be edited, the material data having been generated according to a first time axis of material time;

subject the material data to a time remapping for generating playback data that is to be played according to a second time axis of playback time different from the first time axis, the time remapping being such that a plurality of second time ranges corresponding to a first time range of the one or more time ranges may appear in the playback data;

associate editing information with the material data store the associated editing information along with the material data; and generate playback data that is to be played back from the material data and the stored associated editing information, wherein the playback data is generated by locating a second time range, which includes the material data within the first time-range, in the playback data, wherein generating the playback data that is to be played back includes:

calculating a relationship between the material time and the playback time according to a function depicted as a curve by graphing interpolation values of key frames:

determining, as reference positions, positions of the playback time that correspond to the starting and ending positions of the one more time ranges in the material data, by determining all of the points at which the starting position and the ending position of the set one or more ranges intersect the graph of the interpolation values of the key frames; and determining a playback direction of the material time at the respective reference positions by differentiation of the calculated relationship.

6. The editing apparatus according to claim 5, further comprising a user interface on which to display said second time range in said second time axis or alternatively both said first time range in said first time axis and said second time range in said second time axis.

7. The editing apparatus according to claim 6, wherein:

said first time range of said material data includes particular identification information:

and said processing part causes said particular identification information to be displayed on said user interface when said second time range on said user interface is designated.

8. The editing apparatus according to claim 6, wherein said processing part is further configured to:

associate said first time range in said first time axis with said second time range in said second time axis;

cause said first time range in said first time axis and said second time range in said second time axis to be displayed on said user interface;

change the manner of the displaying of said second time range associated with said first time range, when said first time range on said user interface is designated; and change the manner of the displaying of said first time range associated with said second time range, when said second time range on said user interface is designated.

9. A non-transitory machine-readable medium comprising instructions executable by a computer program, wherein said computer program causes a computer to:

set one or more time ranges in material data to be edited, the material data having been generated according to a first time axis of material time;

subject the material data to a time remapping for generating playback data that is to be played according to a second time axis of playback time different from the first time axis, the time remapping being such that a plurality of second time ranges corresponding to a first time range of the one or more time ranges may appear in the playback data;

associate editing information with the material data;

store the associated editing information along with the material data; and generate playback data that is to be played back from the material data and the stored associated editing information, wherein the playback data is generated by locating a second time range, which includes the material data within the first time-range, in the playback data, wherein generating the playback data that is to be played back includes:
- calculating a relationship between the material time and the playback time according to a function depicted as a curve by graphing interpolation values of key frames;
- determining, as reference positions, positions of the playback time that correspond to the starting and ending positions of the one or more time ranges in the material data, by determining all of the points at which the starting position and the ending position of the set one or more ranges intersect the graph of the interpolation values of the key frames; and
- determining a playback direction of the material time at the respective reference positions by differentiation of the calculated relationship.

10. The non-transitory machine-readable medium according to claim 9, wherein said computer program further causes said computer to display, on a user interface, said second time range in said second time axis or alternatively both said first time range in said first time axis and said second time range in said second time axis.

11. The non-transitory machine-readable medium according to claim 10, wherein:
- said first time range of said material data includes particular identification information; and
- said computer program further causes said computer to execute causing said particular identification information to be displayed on said user interface when said second time range on said user interface is designated.

12. The non-transitory machine-readable medium according to claim 10, wherein said computer program further causes said computer to:
- associate said first time range in said first time axis with said second time range in said second time axis;
- cause said first time range in said first time axis and said second time range in said second time axis to be displayed on said user interlace;
- change the manner of the displaying of said second time range associated with said first time range, when said first time range on said user interlace is designated; and
- change the manner of the displaying of said first time range associated with said second time range, when said second time range on said user interface is designated.

13. The method of claim 1, wherein the time remapping is carried out such that the playback data may include reverse playback of material data.

14. The method of claim 1, wherein determining playback directions at the respective reference positions includes calculating differential values and second order differential values for each of the reference points.

15. An editing apparatus comprising a processor configured to:
- define first and second segments of a material clip;
- define a material time range for the first and second segments;
- define a playback time range for the first segment that is different from the material time range for the first segment;
- in response to defining the playback time range for the first segment, define a playback time range for the second segment such that the sum of the playback time ranges of the first and second segments is equal to the sum of the material time ranges of the first and second segments
wherein defining the playback range includes:
- calculating a relationship between material time and playback time according to a function depicted as a curve by graphing interpolation values of key frames:
- determining, as reference positions, positions of the playback time that correspond to the starting and ending positions of the one or more time ranges in the material data, by determining all of the points at which the starting position and the ending position of the e set one or more ranges intersect the graph of the interpolation values of the key frames; and
- determining a playback direction of the material time at the respective reference positions by differentiation of the calculated relationship;
associate editing information with the material data; and
store the associated editing information along with the material data.

16. The apparatus of claim 15, wherein the material clip is associated with a rate, and wherein the playback time range for the first segment is defined by adjusting a playback rate of the first segment to a rate different front the rate associated with the material clip.

17. The apparatus of claim 16, wherein the processor is further configured to:
- increase the playback rate of the second segment when the playback rate of the first segment is decreased; and
- decrease the playback rate segment then the playback rate of the first segment is increased.

18. The apparatus of claim 16, wherein the processor is further configured to define the playback rate of the first segment as negative.

19. The editing method according to claim 1, further comprising displaying, on a user interface, both said first time range in said first time axis and said second time range in said second time axis.

20. The editing method according to claim 1, wherein the playback direction is determined by calculating differential values and second order differential values for each of the obtained reference points.

21. The editing method according to claim 1, further comprising:
- determining a starting position and an ending position from the reference points based on the determined reference points and their determined playback directions.

22. The editing method according to claim 21, further comprising:
- determining a set of a starting position and an ending position that are within the playback range.

* * * * *